Figure 1:
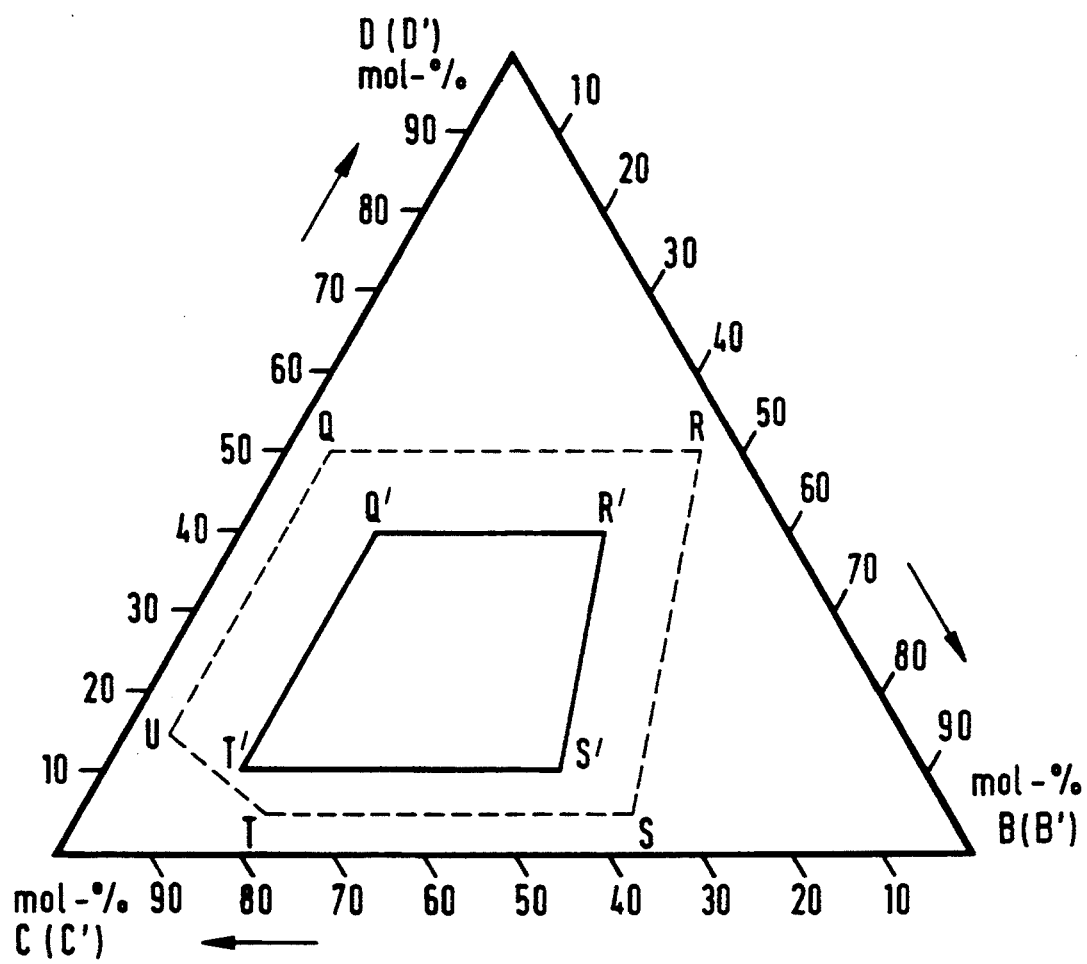

United States Patent [19]

Miess et al.

[11] Patent Number: 5,399,431
[45] Date of Patent: Mar. 21, 1995

[54] FIBER MATERIALS FROM HOMOGENEOUS BLENDS OF AROMATIC POLYAMIDES AND POLY-N-VINYLPYRROLIDONE, PRODUCTION THEREOF, AND USE THEREOF

[75] Inventors: Georg-Emerich Miess, Königstein/Taunus; Peter Klein, Wiesbaden, both of Germany

[73] Assignee: Hoechst Aktiengesellschaft, Frankfurt am Main, Germany

[21] Appl. No.: 72,341

[22] Filed: Jun. 4, 1993

Related U.S. Application Data

[63] Continuation of Ser. No. 515,167, Apr. 26, 1990, abandoned.

[30] Foreign Application Priority Data

Apr. 29, 1989 [DE] Germany .................. 39 14 226.4

[51] Int. Cl.[6] .............................................. D02G 3/00
[52] U.S. Cl. ................................. 428/373; 428/364; 428/394; 428/395; 525/182
[58] Field of Search .............. 428/373, 364; 525/182

[56] References Cited

U.S. PATENT DOCUMENTS

| | | | |
|---|---|---|---|
| 3,036,988 | 5/1962 | Knospe | 260/45.5 |
| 3,564,075 | 2/1971 | Hermann et al. | 260/857 |
| 3,869,429 | 3/1975 | Blades | 260/78 |
| 4,051,300 | 9/1977 | Klein et al. | 428/398 |
| 5,073,440 | 12/1991 | Lee | 428/224 |

OTHER PUBLICATIONS

Wang, C. B. et al, *J. of Polymer Science: Polymer Physics Ed* 21:11–27 (1983).

*Primary Examiner*—Patrick J. Ryan
*Assistant Examiner*—Jill M. Gray
*Attorney, Agent, or Firm*—Connolly and Hutz

[57] ABSTRACT

Fiber materials from synthetic polymers, wherein the synthetic polymer is a homogeneous alloy consisting essentially of
α) poly-N-vinylpyrrolidone (PVP) and
β) at least one homo- or copolyaramide having at least one recurring structural unit of the formula (I)

$$\mathrm{\{C-E^1-C-NH-E^2-NH\}} \quad\quad (I)$$
$$\;\;\;\;\overset{\|}{\mathrm{O}}\;\;\;\;\;\;\;\overset{\|}{\mathrm{O}}$$

where $E^1$ and $E^2$ are identical or different and each is a divalent aromatic or aliphatic radical.

19 Claims, 3 Drawing Sheets

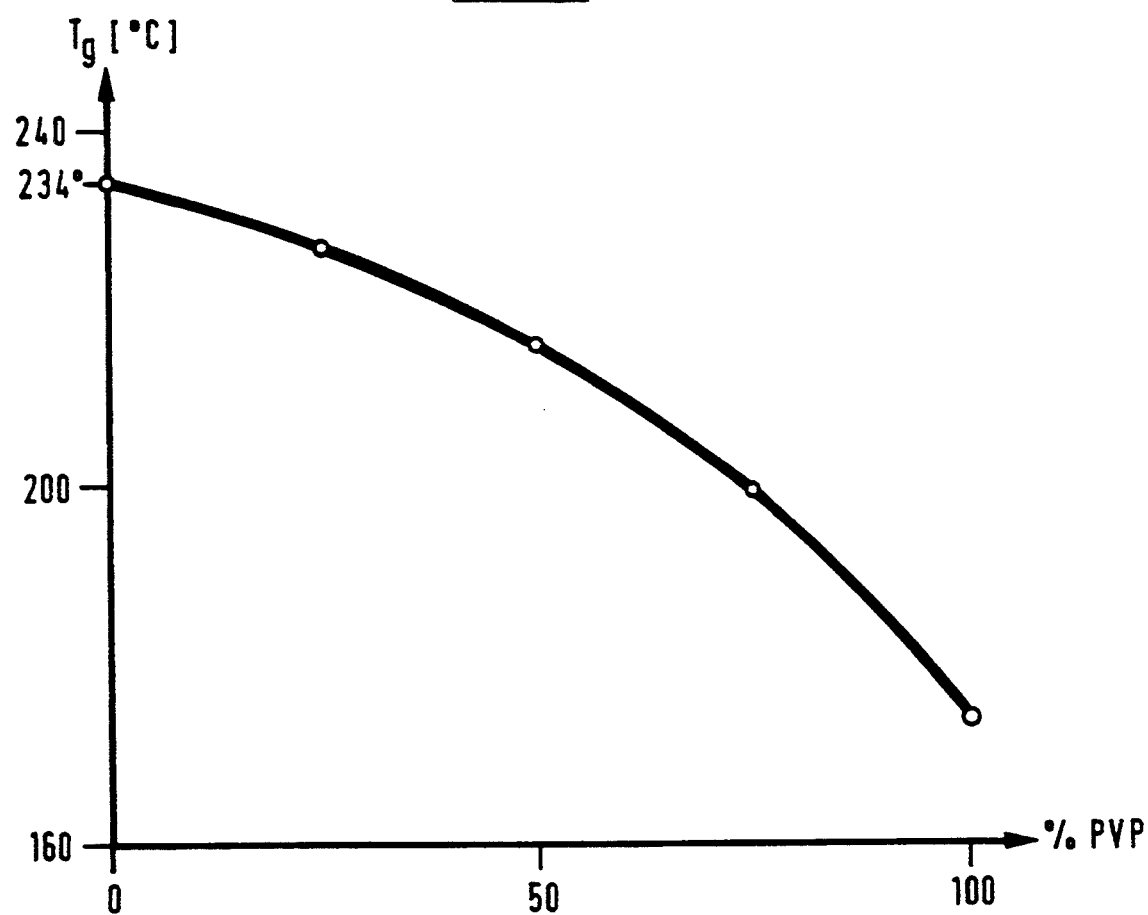

FIBER MATERIALS FROM HOMOGENEOUS BLENDS OF AROMATIC POLYAMIDES AND POLY-N-VINYLPYRROLIDONE, PRODUCTION THEREOF, AND USE THEREOF

This application is a continuation of application Ser. No. 07/515,167, filed on Apr. 26, 1990, now abandoned.

The present invention relates to fiber materials from homogeneous blends of aromatic polyamides with poly-N-vinylpyrrolidone, to a process for producing same and to their use. The term "homogeneous blends" is intended to convey that the components of the blend form an essentially uniform phase.

For the purposes of the present invention, fiber materials are threadlike structures such as monofilaments, yarns, for example multifilament yarn and staple fiber yarn, staple fibers, fiber pulp, including in the form of random-laid webs, laid fabrics, woven fabrics, knitted fabrics and such sheetlike textile materials.

Fiber materials from aromatic polyamides (hereinafter referred to as polyaramides) are known for their excellent thermal, chemical and mechanical properties. They are therefore highly suitable for technical purposes, for example for reinforcing plastics, for use as filter materials or for high-strength tarpaulins and the like.

Poly-N-vinylpyrrolidone (PVP) is commercially available at different molecular weights. At molecular weights of up to about one million PVP even dissolves in cold water. The softening or glass transition temperature of PVP in a completely anhydrous state is 175° C. PVP has the following recurring structural units:

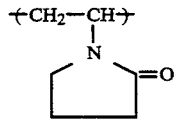

The synthesis and the properties of PVP are described in detail in Houben-Weyl: Methoden der Organischen Chemie, volume XIV/1, pp. 1106 (1961).

It is further known to blend polymers in order to make new materials which are very difficult, if not impossible to arrive at in any other way, for example by copolymerization. Blending can be used in particular to improve technologically important properties, for example thermal stability, mechanical properties and solvent resistance, not least the glass transition temperature which is important for the processing of polymer materials. In addition, their economics are frequently improved.

However, there is still a long way to go before the properties of a blend can be predicted from the properties of the individual components. For this reason the blending of polymers is still largely empirical. A property which has hitherto been especially difficult to predict despite a very great deal of experimental and theoretical work in this field, is whether blends, especially those of strongly interacting polymers, will show homogeneous miscibility or compatibility. For instance, it is known that compatible blends of polymers are rare (Journal of Polymer Science, Polymer Physics Edition, Vol. 21, p. 11 (1983)).

Multiphase blends can usually be distinguished from homogeneously mixed blends by transmission electron microscope examinations of thin sections. Similarly, scanning electron microscope examinations of fracture or etched surfaces of blends permit conclusions about the miscibility of the components present therein.

The production of microporous, high-strength hollow fibers from a stable solution of aromatic polysulfone polymers and aromatic polyamides as fiber-forming polymers, PVP and suitable solvents such as dimethylacetamide or dimethylformamide is known (U.S. Pat. No. 4,051,300). This publication emphasizes that the polyaramide has only limited compatibility with PVP and that the coagulation process described therein, which occurs at the moment of filament formation, gives rise to a phase separation.

It has now been found that certain polyaramides surprisingly form homogeneous blends with PVP which, independently of the mixing ratio of the two components, permit the specific achievement of the abovementioned physical properties and that these alloys are highly suitable for producing fiber materials.

The present invention thus provides fiber materials from homogeneous blends containing essentially α) poly-N-vinylpyrrolidone (PVP) and β) at least one homopolyaramide or copolyaramide having at least one recurring structural unit of the formula (I)

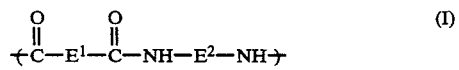

where $E^1$ and $E^2$ are identical or different and are each selected from the groupings

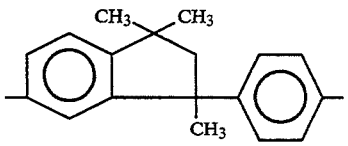

—Ar$^1$—

—Ar$^1$—X—Ar$^2$—, where Ar$^1$ and Ar$^2$ are identical or different 1,2-phenylene, 1,3-phenylene or 1,4-phenylene radicals which may be substituted by ($C_1$-$C_6$)-alkyl, ($C_1$-$C_6$)-alkoxy, preferably each having up to 4 carbon atoms in the alkyl group, —$CF_3$ or halogen, for example fluorine, chlorine or bromine, and Ar$^1$ is additionally 1,2-, 1,3-, 1,4-, 1,5-, 1,6-, 1,7-, 1,8-, 2,3-, 2,6- or 2,7-naphthylene and X is a) a direct bond of one of the following divalent radicals: —O—, —$SO_2$—, —CO—, —CO—NH—, —C($R^1$)$_2$—, where $R^1$ is hydrogen, ($C_1$-$C_6$)-alkyl or fluoroalkyl of 1–4 carbon atoms in the alkyl group, such as —$CH_2$—, —C($CH_3$)$_2$— or —C($CF_3$)$_2$— or b) —Z—Ar$^1$—Z—, where Z is —O— or —C($CH_3$)$_2$—, or c) —O—Ar$^1$—Y—Ar$^2$—O—, where Y has the meaning indicated for X under a).

The homo- or copolyaramide is formed from recurring structural units of the formula (I). The individual structural units of the polymers can be different, so that in the case of the copolymers not only $E^1$ but also $E^2$ may represent different radicals.

The element

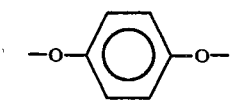

of the structural unit of the formula I is derived for example from the following compounds:

aromatic dicarboxylic acid derivatives of the formula Cl—CO—Ar¹—CO—Cl such as 4,4'-sulfodibenzoyl dichloride, 4,4'-oxydibenzoyl dichloride, 4,4'-biphenyldicarbonyl dichloride, 2,6-naphthalenedicarbonyl dichloride, isophthaloyl chloride, but in particular terephthaloyl chloride and substituted terephthaloyl chloride, e.g. 2-chloroterephthaloyl chloride.

The element —NH—E₂—NH— is derived from aromatic diamines of the structure H₂N—Ar¹—NH₂ such as m-phenylenediamines or substituted phenylenediamines, e.g. 2-chloro-, 2,5-dichloro- or 2-methoxy-p-phenylenediamine, in particular p-phenylenediamine, substituted benzidine derivatives of the formula

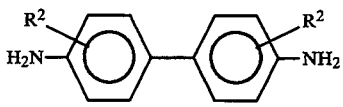

where R² is lower alkyl or alkoxy of up to 4 carbon atoms in either case in the alkyl group, preferably —CH₃ or —OCH₃, or F, Cl or Br, such as 3,3'-dimethoxy-, 3,3'-dichloro-, 2,2'-dimethyl- and preferably 3,3'-dimethyl-benzidine, diamino components of the formula H₂N—Ar¹—X—Ar²—NH² such as 4,4'-diaminobenzophenone, bis(4-aminophenyl)sulfone, bis[4-(4'-aminophenoxy)phenyl]sulfone, 1,2-bis(4'-aminophenoxy)benzene, 4,4'-diaminodiphenylmethane, 1,4-bis[(4'-aminophenyl)isopropyl]benzene, 2,2'-bis[4-(4'-aminophenoxy)phenyl]propane, in particular 1,4-bis(4'-aminophenoxy)benzene.

The elements —CO—E¹—CO— and —NH—E²—NH— can also be derived from mixtures of the abovementioned dicarbonyl chlorides and/or the diamines.

Preferably E¹ is a 1,3- or 1,4-phenylene radical, the radical

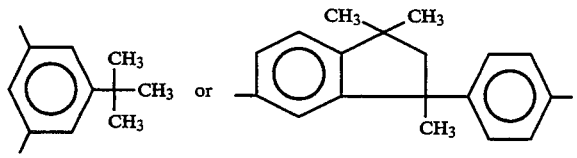

and E² is a 1,4-phenylene radical or the radical

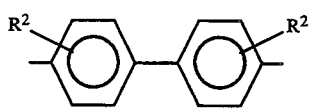

where R¹ is lower alkyl or alkoxy each having up to 4 carbon atoms in the alkyl group or F, Cl or Br, or the radical

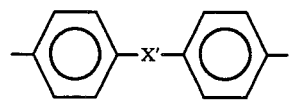

where X' is the group —C(R¹)₂—, where R¹ is hydrogen or (C₁-C₄)-alkyl, or represents the grouping

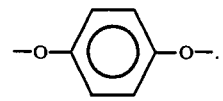

Particular preference is given to an alloy which besides PVP contains at least one copolyaramide having at least three randomly recurring structural units of the formula (I) where E¹ is a divalent p-phenylene radical and E² in the three recurring structural units is one each of a divalent p-phenylene radical, a radical of the formula

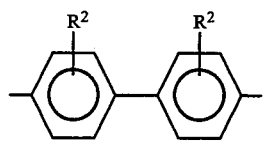

where R² is —CH₃—, OCH₃, F, Cl or Br, and a radical of the formula

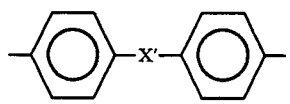

where X' is as defined above, especially a copolyaramide possessing the recurring structural units

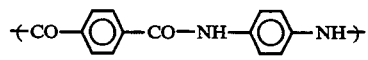

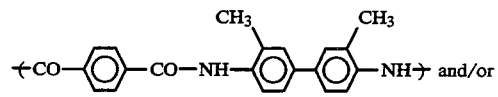 and/or

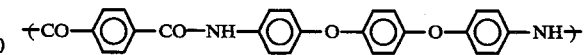

The molecular weight of the PVP present in the blends is in general as a weight average from 1,000 to 3,000,000, preferably from 40,000 to 200,000, in particular from 50,000 to 100,000.

The blends which make up the fiber materials according to the present invention contain the PVP in amounts of from 7 to 70% by weight, preferably of from 15 to 60% by weight, particularly preferably from 45 to 55% by weight, based on the total amount of the components (α+β).

The blends may contain additives in customary amounts, for example thermal stabilizers or UV stabilizers. In addition they may contain further polymers, for example polyimides or polyesters, for example in amounts up to 10% by weight. In both cases the mixing ratios are always based on the total amount of the components (α+β).

The glass transition temperature of the blends and hence the glass transition temperature of the fiber materials according to the present invention can be varied in a specific manner by varying the PVP content. FIG. 3 shows for example the dependence of the glass transition temperature of a blend which contains aramide having a glass transition temperature of about 235° C. on its PVP content. There is a continuous transition from a glass transition temperature of one component to that of the other component. Their water uptake capacities can also be affected in the same way. Colored fiber materials according to the present invention may contain colored PVP copolymers. Finally, the use of the blends according to the present invention is more economical than that of aramides.

The homogeneous miscibility of the components of the blends was demonstrated using several of the aforementioned methods. For example, those homogeneous blends which contain a polyaramide having a glass transition temperature which, by differential scanning calorimetry, is below the decomposition temperature have a single glass transition temperature which by differential scanning calorimetry is between that of PVP (175° C.) and that of the polyaramide used. It is also very surprising that the water-soluble PVP is not dissolved by water out of the fiber materials according to the present invention, not even by boiling for several hours. This is further evidence that the blends underlying the fiber material according to the present invention consist of homogeneously mixed components.

A preferred group of fiber materials according to the present invention consists of polymer blends which, besides PVP, contain a copolyaramide which has at least the recurring structural units of the formulae

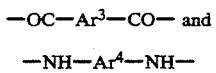

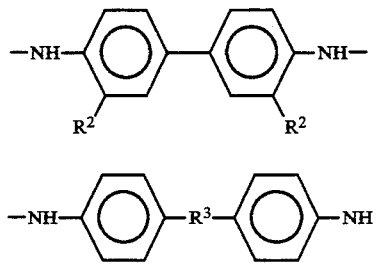

where
— $Ar^3$— and —$Ar^4$— are each phenylene or naphthylene radicals where the valence bonds are in the para or a similar coaxial or parallel position and which can be substituted like $Ar^1$ and $Ar^2$,
— $R^2$ is lower alkyl or lower alkoxy, each of up to 4 carbon atoms, or halogen, and
— $R^3$— is a radical of the formula —$C(R^1)_2$—, where $R^1$ is hydrogen, $(C_1-C_6)$-alkyl or fluoroalkyl having 1–4 carbon atoms in the alkyl group, such as —$CH_2$—, —$C(CH_3)_2$— or —$C(CF_3)_2$— or a grouping —O—$Ar^4$—O—, where —$Ar^4$— has the same structure as in the cases above,
and the proportions, in mol %, of the diamine components B, C and D relative to the total amount of diamine components are within a domain which is defined by the following corner points in the triangular coordinate system of FIG. 1:

Point Q corresponding to 5 mol % of B, 45 mol % of C and 50 mol % of D;
Point R corresponding to 45 mol % of B, 5 mol % of C and 50 mol % of D;
Point S corresponding to 60 mol % of B, 35 mol % of C and 5 mol % of D;
Point T corresponding to 20 mol % of B, 75 mol % of C and 5 mol % of D;
Point U corresponding to 5 mol % of B, 80 mol % of C and 15 mol % of D.

Preference is given to a domain defined by the corner points
Point Q' corresponding to 15 mol % of B, 45 mol % of C and 40 mol % of D;
Point R' corresponding to 40 mol % of B, 20 mol % of C and 40 mol % of D;
Point S' corresponding to 50 mol % of B, 40 mol % of C and 10 mol % of D;
Point T' corresponding to 15 mol % of B, 75 mol % of C and 10 mol % of D.

Particular preference is given to domains having the corner points defined hereinafter. They are shown in graph form in FIG. 2.
Point W corresponding to 5 mol % of B, 45 mol % of C and 50 mol % of D;
Point X corresponding to 45 mol % of B, 5 mol % of C and 50 mol % of D;
Point Y corresponding to 45 mol % of B, 40 mol % of C and 15 mol % of D;
Point Z corresponding to 5 mol % of B, 80 mol % of C and 15 mol % of D.

Fiber materials from this group of blends are obtained with excellent properties in particular if in the copolyamide portions of the blends the individual portions of the diamine components, in mol %, relative to the total amount of the diamine components lie within a narrower domain which is defined by the following corner points:
Point W' corresponding to 15 mol % of B, 50 mol % of C and 35 mol % of D;
Point X' corresponding to 45 mol % of B, 20 mol % of C and 35 mol % of D;
Point Y' corresponding to 45 mol % of B, 40 mol % of C and 15 mol % of D;
Point Z' corresponding to 15 mol % of B, 70 mol % of C and 15 mol % of D.

Figure 2:
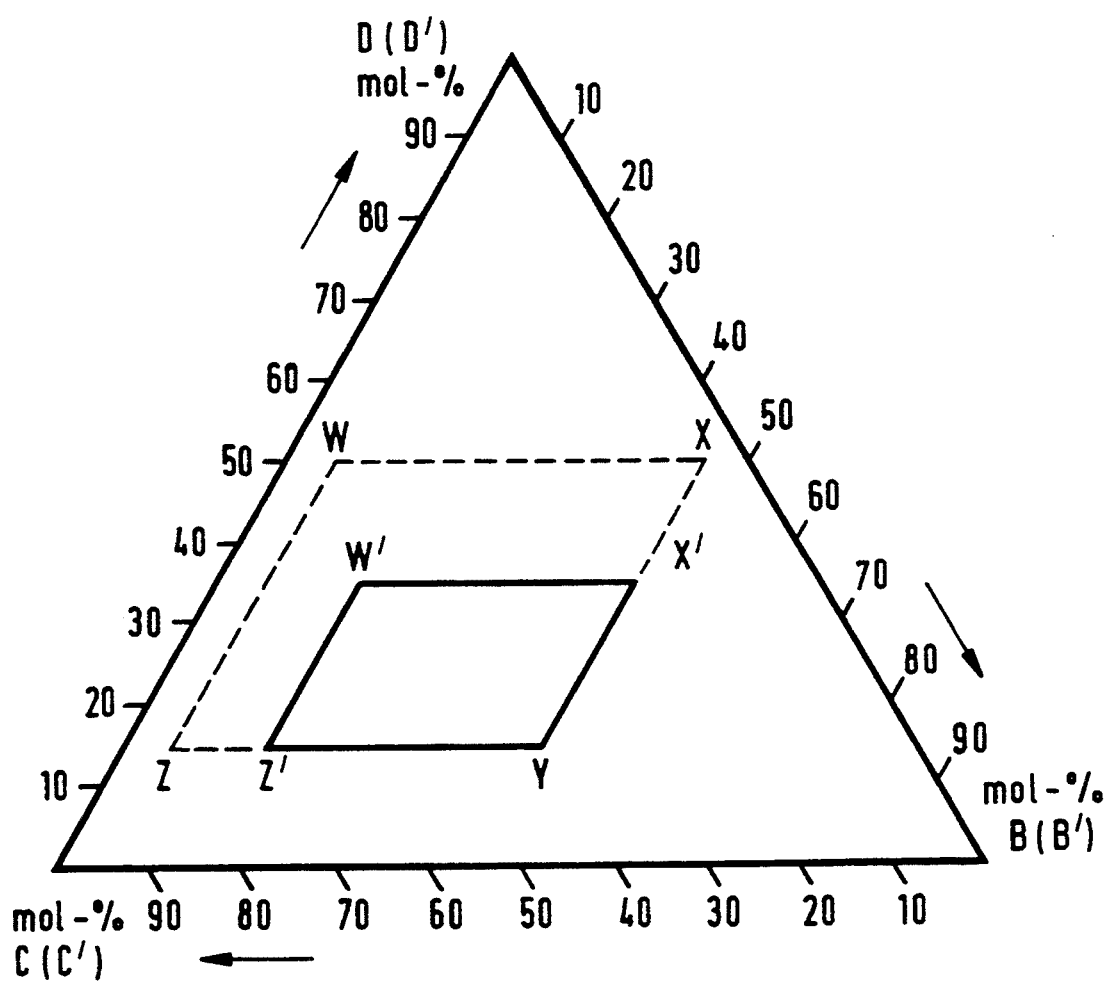

These narrower domains likewise show triangular coordinates in FIG. 2.

In the copolyaramides of this preferred group of fiber materials according to the present invention, $Ar^3$ and $Ar^4$ are each preferably 1,4-phenylene and $R^2$ is preferably —$CH_3$, —$OCH_3$ or —Cl.

The inherent viscosity of these preferred copolyamides should be between 2.4 and 20 dl/g. The preferred upper limit for the viscosity is 10 dl/g. It was determined on solutions of 0.5 g of polymer at a time in 100 ml of 98% strength by weight sulfuric acid at 25° C.

The inherent viscosity is given by the expression $$\frac{\ln \eta_{rel}}{c}$$

where $\eta_{rel}$ is the relative viscosity and c is the concentration in g/100 ml.

A further preferred group of fiber materials according to the present invention consists of polymer compounds which besides PVP contain a copolyaramide which consists to an extent of not less than 95 mol % of recurring structural units of the formulae $$-OC-Ar^5-CO- \quad E)$$

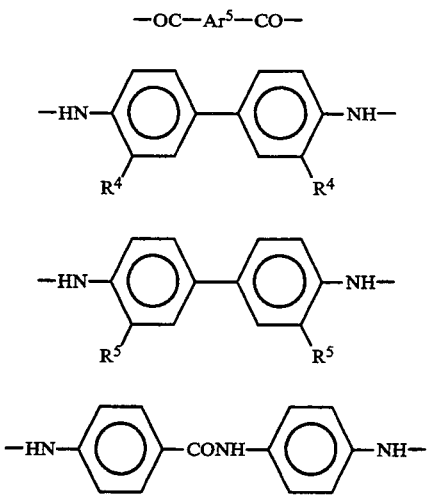

F)

G)

H)

and to an extent of not greater than 5 mol % of structural units J and/or K which contain m-bonds and are derived from aromatic dicarboxylic acids (J') and/or of aromatic diamines (K'), the total molar proportions of structural units E+J and of the molar proportions of the structural units F+G+H+K being essentially the same, —$Ar^5$— is a phenylene or naphthylene radical whose valence bonds are in the para- or a similar coaxial or parallel position and which can be substituted by one or two inert radicals, such as lower alkyl or halogen, —$R^4$ and —$R^5$ are mutually different lower alkyl radicals or lower alkoxy radicals, and the proportions of diamine components F, G and H relative to the total amount of these diamine components are within the following limits:

| structural unit F: | 30–55 mol %, preferably 33–47 mol % |
| --- | --- |
| structural unit G: | 15–35 mol %, preferably 20–33 mol % |
| structural unit H: | 20–40 mol %, preferably 33–40 mol % |

The radicals $R^4$ and $R^5$ are different from each other. This means that $R^4$ and $R^5$ can be for example two different alkyl radicals or two different alkoxy radicals. Preferably, however, $R^4$ is alkyl and $R^5$ is alkoxy. In particular, $R^4$ is methyl and $R^5$ is methoxy The radical $Ar^5$ can be for example 1,4-phenylene, 1,4-, 1,5- or 2,6-naphthylene or 4,4'-biphenylylene.

Preferably $Ar^5$ is 1,4-phenylene which is unsubstituted or substituted by lower alkyl or halogen, in particular 1,4phenylene which is unsubstituted or substituted by methyl or chlorine.

Particularly preferably $Ar^5$ is unsubstituted 1,4-phenylene.

A further preferred group of fiber materials according to the present invention consists of polymer blends which besides PVP contain a copolyaramide which consists to an extent of not less than 95 mol % of recurring structural units of the formulae

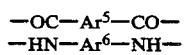

L)
M)

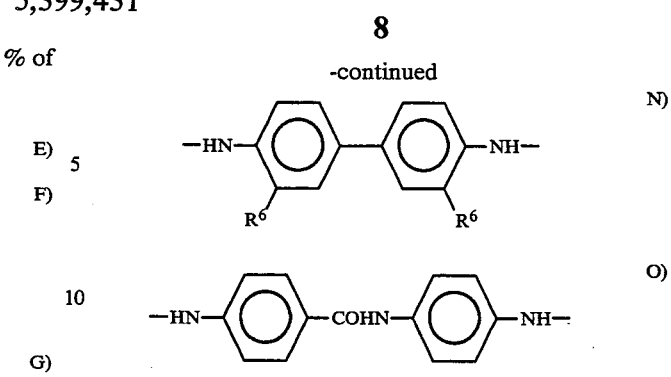

N)

O)

and to an extent of not more than 5 mol % of structural units J and/or K which contain m-bonds and are derived from aromatic dicarboxylic acids (J') and/or from aromatic diamines (K'), the totals of the molar proportions of structural units L+J and of the molar proportions of structural units M+N+O+K being essentially the same, —$Ar^5$— and —$Ar^6$— are each phenylene or naphthylene radicals whose valence bonds are in the para or a similar coaxial or parallel position and which can be substituted by one or two inert radicals, such as lower alkyl or halogen, —$R^6$ is lower alkyl and the proportions of diamine components M, N and O relative to the total amount of these diamine components are within the following limits:

| structural unit M: | 15–25 mol %, preferably 15–20 mol % |
| --- | --- |
| structural unit N: | 45–65 mol %, preferably 50–55 mol % |
| structural unit O: | 15–35 mol %, preferably 25–30 mol % |

In the above formulae,

—$Ar^5$— is for example 1,4-phenylene, 1,4-, 1,5- or 2,6-naphthylene or 4,4'-biphenylylene and —$Ar^6$— is 1,4-phenylene or 1,4-, 1,5- or 2,6-naphthylene.

Preferably —$Ar^5$— and —$Ar^6$— are 1,4-phenylene radicals which are unsubstituted or substituted by lower alkyl, in particular methyl, or halogen, in particular chlorine.

Particularly preferably —$Ar^5$— and —$Ar^6$— are each unsubstituted 1,4-phenylene.

$R^6$ is preferably alkyl of 1 or 2 carbon atoms, in particular methyl.

A further preferred group of fiber materials according to the present invention consists of polymer blends which besides PVP contain a copolyaramide which consists to an extent of not less than 95 mol % of recurring structural units of the formulae

L)
M)

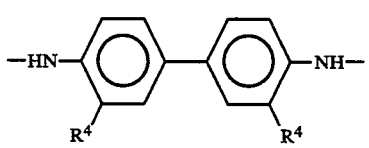

P)

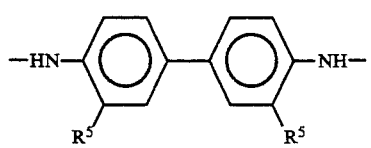

and to an extent of not more than 5 mol % of structural units J and/or K which contain m-bonds and are derived from aromatic dicarboxylic acids (J') and/or from aromatic diamines (K'), the totals of the molar proportions of structural units L+J and of the molar proportions of structural units M+P+R+K being essentially the same, —$Ar^5$— and —$Ar^6$— are phenylene or naphthylene radicals whose valence bonds are in para or a similar coaxial or parallel position and which can be substituted by one or two inert radicals, such as lower alkyl or halogen, —$R^4$ and —$R^5$ are mutually different lower alkyl radicals or lower alkoxy radicals, and the proportions of diamine components M, P and R in relation to the total amount of these diamine components are within the following limits:

| structural unit B: | 20–30 mol %, preferably 25–30 mol % |
| structural unit C: | 35–55 mol %, preferably 40–50 mol % |
| structural unit D: | 15–40 mol %, preferably 25–30 mol % |

The valence bonds which are in a coaxial or parallel position point in opposite directions. An example of coaxial bonds pointing in opposite directions are the 4,4'-biphenylylene bonds. An example of parallel bonds pointing in the opposite direction are for example the 1,5- and 2,6-naphthylene bonds, whereas the 1,8-naphthylene bonds are parallel but point in the same direction.

Divalent aromatic radicals —$Ar^5$— where the valence bonds are in the para or a similar coaxial or parallel position are monocyclic or bicyclic fused aromatic radicals such as, for example 1,4-phenylene, 1,4-naphthylene, 1,5-naphthylene, 2,6-naphthylene and 4,4'-biphenylylene.

Preferably —$Ar^5$— is 1,4-phenylene.

The radical —$Ar^5$— can be monosubstituted or disubstituted by lower alkyl, i.e. straight-chain or branched alkyl of 1 to 4 carbon atoms, or by halogen, in particular F, Cl or Br. Preferred alkyl substituents are straight-chain, in particular methyl and ethyl. The preferred halogen substituent is chlorine.

Besides the structural units having para-disposed or similar coaxial or parallel bonds pointing in opposite directions, the polyamides according to the present invention may contain up to 5 mol %, based on all structural units, of structural units J and K which contain m-bonds.

Structural units J and K with m-bonds for the purposes of the present invention are those which contain an aromatic nucleus which is held within the chain of the polymer molecule by bonds which are in the m-position relative to each other.

Such structural units are for example the radicals of isophthalic acid, m-phenylenediamine, 3,4'-diaminobiphenyl or their alkyl and/or alkoxy substitution products, or in particular 3,4'- or 3',4-diaminobenzanilide.

It will be readily understood by those skilled in the art that within the aramides the total of all the structural units derived from aromatic acids and the total of all structural units derived from aromatic amines will be essentially the same; that is, they will not differ by more than about 1%, preferably by not more than 0.2%, in particular matching one another within the limitations of practical measuring and metering means to such an extent as to produce the desired high molecular weights for the coaramide.

To produce the fiber materials according to the present invention from the polyaramide/PVP blends, solutions of these blends in a suitable aramide solvent, in particular an aprotic organic solvent, e.g. dimethylformamide, dimethylacetamide, dimethyl sulfoxide or N-methylpyrrolidone, are filtered, devolatilized and spun in a conventional manner. This may be effected for example by using a wet spinning line, where the polymer solution is extruded through suitable Jets to a coagulating bath and the resulting filaments are pulled through wash baths and drawn at higher temperature. Suitable coagulating baths are aqueous solutions of the same amide-dissolving solvent which is also used to produce the polymer solution. However, it also possible to use aqueous salt solutions, for example calcium chloride solutions.

Only relatively small wet stretch occurs during the extrusion of the polymer solutions and during takeup of the filaments or films from the coagulating bath. For this reason the filaments coming out of the coagulating baths must, after the conventional washing and drying, be subjected to a further stretching operation in order that desirable mechanical properties, such as a high modulus of elasticity and a high tensile strength, be conferred on them.

The total stretching in the course of the production of the fiber materials according to the present invention is accordingly the product of the small stretch ratio wet stretch and the subsequent higher stretch ratio drawing operation. This drawing operation is in general carried out in a conventional manner at elevated temperature on stretching systems where a single- or multi-stage drawing operation takes place between godet rolls rotating at different circumferential speeds.

To heat the filaments to the drawing temperature required, a contact drawing operation may be carried out by drawing the filaments over hotplates mounted within the stretching zone of the stretching system which have surface temperatures of 280° C. to 460° C., preferably 340° C. to 450° C. In the course of this drawing operation, the filaments are drawn in a ratio of from 1:4.0 to about 1:15, preferably from 1:4 to 1:12.

Another suitable version of the spinning process is the dry jet wet spinning process as described for example in U.S. Pat. No. 3,414,645. In said process, spinning takes place in a downward direction and after emerging from the Jet the spun filaments first pass through a gaseous medium, preferably air, before entering an aqueous coagulation bath. The rest of the treatment of the filaments thus produced is carried out as described above. The fibers, filaments or fiber pulp produced from the polyaramide/PVP blends serve for example as textile fibers, reinforcing materials for plastics and as materials of construction for filtration and insulation purposes. It is a considerable advantage of the fiber materials according to the present invention that by varying the blend composition in respect of a) the aramide/PVP ratio, b) the PVP grade and c) the aramide grade they can be optimized to the various intended uses.

The blends from which the fiber materials according to the present invention are spun can in general be prepared in a conventional manner from a conjoint solution of PVP and a polyaramide in an aprotic organic solvent, for example dimethylformamide, dimethyl sulfoxide, N-methylpyrrolidone or N,N-dimethylacetamide. There are for example the following possibilities:

1. a) Polycondensation of polyaramide by solution, interface or melt condensation,
   b) dissolving the resulting polyaramide,
   c) dissolving of PVP and
   d) subsequent mixing of the PVP solution with the polyaramide solution.
2. a) Solution condensation of polyaramide and
   b) subsequent direct admixing of dry PVP or a PVP solution directly into the polycondensation batch.
3. a) Solution condensation of polyaramide in the presence of PVP. This again produces homogeneous mixtures of components. To this end the diamines are dissolved together with PVP and, by the addition of dicarbonyl dichlorides, condensed to form a PVP/polyaramide solution.

The blends can be isolated by removing the solvent, preferably by evaporating it, or the resulting PVP/polyaramide solutions are further processed directly in a conventional manner to give the fiber materials according to the present invention.

The polyaramides contained in the blends can in general be prepared in a conventional manner by the solution, interface or melt condensation of approximately equivalent amounts of reactive derivatives, in general chlorides, of dicarboxylic acids of the formula HOOC—$E^1$—COOH with diamines of the formula $H_2N$—$E^2$—$NH_2$. Here the way the polycondensation is carried out determines whether random, block or graft copolymers are obtained.

The solution condensation of the aromatic dicarboxylic acid derivatives, for example dicarbonyl dichlorides, with aromatic diamines is carried out in aprotic, polar solvents of the amide type such as N,N-dimethylacetamide or in particular N-methyl-2-pyrrolidone. If necessary, halide salts of groups one and/or two of the Periodic Table may be added to these solvents in a conventional manner to increase the solvent power and/or to stabilize the polyamide solutions. Preferred additives are calcium chloride or lithium chloride. The exact amount of dicarboxylic acid derivative is so chosen as to achieve the desired solution viscosity.

The polycondensation temperatures are customarily between $-20°$ and $+120°$ C., preferably between $+10°$ and $+100°$ C. Particularly good results are obtained at reaction temperatures between $+10°$ and $+80°$ C. The polycondensation reactions are in general carried out in such a way that, after the reaction has ended, from 2 to 30, preferably 3.5 to 15, % by weight of polycondensate is present in this solution.

In the course of the polycondensation there is an increase in the molecular weight of polymer and hence also in the viscosity of the reaction batch.

The polycondensation may be stopped in a conventional manner, for example by adding a monofunctional compound such as benzoyl chloride.

The molecule has in general grown to adequate chain length when the viscosity of the polymer solution obtained in the course of the polycondensation corresponds to an inherent viscosity of the polymer of from about 4.5 to 9.0 dl/g.

Here inherent viscosity is again to be understood as meaning the abovementioned expression $$\eta_{inh} = \frac{\ln \eta_{rel}}{c}$$

After the polycondensation has ended, or the polymer solution has achieved the viscosity required for further processing, the hydrogen chloride which is formed and is loosely bound to the amide type solvent is neutralized by the addition of a basic substance. A suitable substance for this purpose is for example lithium hydroxide, calcium hydroxide or especially calcium oxide.

The Examples which follow, and which are intended to illustrate the present invention, use the following abbreviations:

PPD: p-phenylenediamine
DMB: 3,3-dimethylbenzidene
BAPOB: 1,4-bis(aminophenoxy)benzene
DABA: 4,4'-diaminobenzanilide
DADPM: 4,4'-diaminodiphenylmethane
DMOB: 3,3'-dimethoxybenzidene
DCIB: 3,3'-dichlorobenzidene
TPC: terephthaloyl chloride

EXAMPLE 1 a) 36.8 g (0.1 mol) of BAPOB, 42.4 g (0.2 mol) of DMB, 10.8 g (0.1 mol) of PPD, 5.5 g of calcium chloride and 5.5 g lithiumchloride were dissolved in 2,170 g of N-methylpyrrolidone under an inert gas at 10° C. 82.2 g (0.45 mol) of TPC were added at between 10° C. and 68° C. in the course of 90 minutes. After the polymerization had ended, the batch was neutralized with 24.5 g of calcium oxide (96% strength), filtered and devolatilized. The polymer solution thus prepared contains 6% by weight of a copolyaramide, 2.1% by weight of calcium chloride and 0.23% by weight of lithiumchloride. The copolyaramide has an inherent viscosity of 5.9 dl/g.

b) The copolyamide solution prepared under a) is admixed with 78.7 g of polyvinylpyrrolidone having an average molecular weight $M_w=49,000$ (®Luviskol K30 from BASF), and the mixture was masticated at 110° C. for 2 hours. The polymer solution thus obtained contains a blend which based on the polyaramide contains 50% by weight of PVP.

This solution was filtered, devolatilized and wetspun. To this end it was extruded at a rate of 16.0 meters/minute through a jet of 100 holes each 0.1 mm in diameter into a coagulation bath comprising a hot solution of 35% by weight of N-methylpyrrolidone in water at 80° C. The filaments obtained were pulled at a speed of 120.5 meters/minute through two water baths and a washer and then over a dry godet roll and a hotplate at a temperature of 400° C.

The multifilament denier obtained was 196 dtex, the tenacity was 134 cN/tex and the elongation at break was 2.7%. The initial modulus, which here as in all the subsequent Examples was read off the stress-strain diagram, was 54 N/tex, based on 100% extension.

EXAMPLE 2 a) A copolyaramide solution was prepared as described in Example 1 a. 157.4 g of polyvinylpyrrolidone having an average molecular weight $M_w=49{,}000$ (®Luviskol K30) were kneaded into this solution at 110° C. in the course of 2 hours. The polymer solution thus obtained contains a copolyaramide and a polyvinylpyrrolidone in a weight ratio of 1:1.

The filtered and devolatilized solution was spun through a 100-hole jet, each hole having a diameter of 0.1 mm, into a hot coagulation bath comprising 35% of N-methylpyrrolidone in water at 80° C.

The filaments were washed as described in Example 1, dried and drawn over a hotplate at 390° C. to a draw ratio of 1:6.59. The multifilament bundle thus obtained has a total denier of 199 dtex, a tenacity of 98 cN/tex, an elongation at break of 2.6% and an initial modulus of 43 N/tex.

EXAMPLE 3 a) 8.6 g (0.08 mol) of PPD, 46.64 g (0.22 mol) of DMB, 22.7 g (0.1 mol) of DABA, 5.5 g of calcium chloride and 5.5 g of lithium chloride were dissolved into 2,170 g of N-methylpyrrolidone under an inert gas at 10° C. 82.2 g (0.405 mol) of TPC were added at between 10° C. and 68° C. in the course of 90 minutes, the mixture was neutralized with 24.5 g of calcium oxide (96% strength) and then filtered and devolatilized. The copolyaramide solution thus obtained contained 5.5% of the polymer, 2.1% of calcium chloride and 0.23% of lithium chloride. The copolymer had an inherent viscosity of 12.16 dl/g.

b) 65.47 g of PVP having an average molecular weight $M_w$ of 49,000 are stirred into the copolyaramide solution prepared under a), and the mixture is subsequently masticated at 110° C. for 2 hours. The polymer solution prepared in this way contains a blend of 50% by weight of the copolyaramide and 50% by weight of PVP.

The solution was spun through a 100-hole jet having a hole diameter of 0.15 mm into a coagulation bath comprising 35% strength aqueous N-methylpyrrolidone at 80° C.

This spinning was done via the dry jet wet spinning process where the jet is a few mm above the surface of the coagulation bath. The filaments obtained were washed as described in Example 1, dried and drawn over a hotplate at 420° C. to a draw ratio of 1:9. The multifilament bundle had a denier of 188 dtex, a tenacity of 137 cN/tex, an elongation at break of 2.3% and an initial modulus of 63 N/tex.

EXAMPLE 4 a) A polyaramide solution was prepared as described in Example 3 a.

b) This polyaramide solution was admixed with 196.4 g of PVP of average molecular weight $M_w$ 49,000 (®Luviskol K30) and masticated at 110° C. for 2 hours.

This spinning solution contains a blend of polyaramide/PVP in a weight ratio of 1:3.

The spinning solution was spun through a 100-hole jet having a hole diameter of 0.15 mm into a coagulation bath comprising 38% strength aqueous methylpyrrolidone solution at 80° C. As in Example 3, the jet was situated a few mm above the surface of the coagulation bath. The filaments obtained were washed as described in Example 1, dried and drawn over a hotplate at 440° C. to a draw ratio of 1:5.49. The multifilament bundle obtained had a denier of 367 dtex, a tenacity of 92 cN/tex, an elongation at break of 2.0% and an initial modulus of 48 N/tex.

EXAMPLE 5 a) 10.7 g (0.1 mol) of PPD, 27.7 g (0.14 mol) of DADPM, 33.9 g (0.16 mol) of DMB, 5.5 g of calcium chloride and 5.5 g of lithium chloride were dissolved in 2,170 g of N-methylpyrrolidone under an inert gas at 10° C.

82.2 g (0.405 mol) of TPC were added at between 10° C. and 68° C. in the course of 90 minutes, and the mixture was neutralized with 24.5 g of calcium oxide (96% strength), filtered and devolatilized. The polymer solution thus obtained contains 5.3% by weight of polyaramide, 2.1% of calcium chloride and 0.23% of lithium chloride. The copolyaramide has an inherent viscosity of 6.01 dl/g.

b) The copolyaramide solution prepared under a) is admixed with 62.65 g of PVP of average molecular weight $M_w=49{,}000$ (®Luviskol K30), and the mixture is kneaded at 110° C. for 2 hours until homogeneous. Thereafter the solution is filtered and devolatilized.

The spinning solution thus obtained was spun by the dry jet wet process described in the preceding Examples through a 100-hole jet having a hole diameter of 0.15 mm. The coagulation bath was a hot 35% strength by weight aqueous N-methylpyrrolidone solution at 80° C. The filaments obtained were washed as described in Example 1, dried and drawn over a hotplate at 420° C. to a draw ratio of 1:9.56. The multifilament bundle obtained had a denier of 91 dtex, a tenacity of 98 cN/tex, an elongation at break of 2.5% and an initial modulus of 42 N/tex.

What is claimed is:

1. A fiber material formed from a synthetic polymer, wherein the synthetic polymer is a homogeneous blend consisting essentially of α) poly-N-vinylpyrrolidone and β) at least one polyaramide having at least one recurring structural unit of the formula (I)

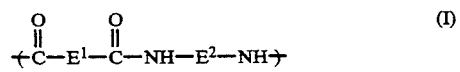

where $E^1$ and $E^2$ are identical or different and are each selected from the group consisting of

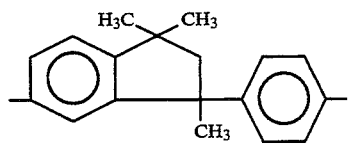

—Ar$^1$— and

—Ar$^1$—X—Ar$^2$—, where Ar$^1$ and Ar$^2$ are identical or different 1,2-phenylene, 1,3-phenylene or 1,4-phenylene radicals which are optionally substituted by ($C_1$-$C_6$)-alkyl, ($C_1$-$C_6$)-alkoxy, —$CF_3$ or halogen, and Ar$^1$ is additionally selected from the group consisting of 1,2-, 1,3-, 1,4-, 1,5-, 1,6-, 1,7-, 1,8-, 2,3-, 2,6- and 2,7-naphthylene and X is a) a direct bond or one of the following divalent radicals: —O—, —$SO_2$—, —CO—, —CO—NH—, —C($R^1$)$_2$, where $R^1$ is hydrogen, ($C_1$-$C_6$)-alkyl or fluoroalkyl of 1–4 carbon atoms in the alkyl group, or b) —Z—Ar¹—Z— where Z is —O — or —C(CH₃)₂—, or c) —O—Ar¹—Y—Ar²—O—, where Y is a direct bond or one of the following divalent radicals: —O—, —SO₂—, —CO—, —CO—NH—, —C(R¹)₂— where R¹ is hydrogen, (C₁-C₆)-alkyl or fluoroalkyl of 1-4 carbon atoms in the alkyl group, wherein said homogeneous blend fiber material has been obtained by spinning filaments, into a coagulation bath, from a polar aprotic solvent solution containing said synthetic polymer, to form a multifilament bundle, said coagulation bath comprising an aqueous solution containing a polar aprotic solvent.

2. The fiber material as claimed in claim 1, wherein the blend contains from 7 to 78% by weight of poly-N-vinylpyrrolidone.

3. The fiber material as claimed in claim 1, wherein the molecular weight of the poly-N-vinylpyrrolidone reported as a weight average, is from 1,000 to 3 million.

4. The fiber material as claimed in claim 1, wherein the blend contains a polymer having groups E¹ which are identical or different and each is 1,3- or 1,4-phenylene or the radical

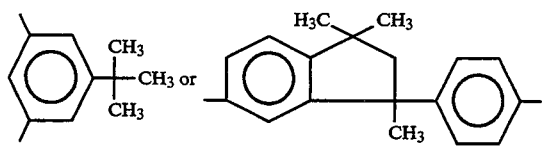

5. The fiber material as claimed in claim 1, wherein the blend contains a polyaramide with units having group E² which are identical or different and each is 1,4-phenylene or the radical

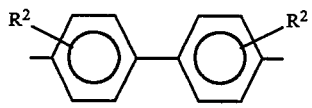

where R² is lower alkyl or alkoxy each having up to 4 carbon atoms in the alkyl group or F, Cl or Br, or the radical

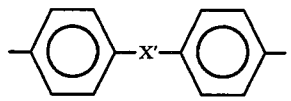

where X' is Fl the group —C(R¹)₂— where R¹ is hydrogen or (C₁-C₆)-alkyl or which polyaramide has the structural units

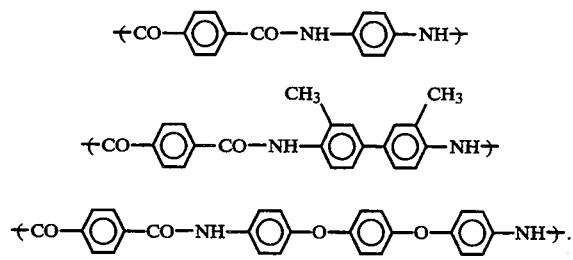

6. The fiber material as claimed in claim 1, wherein the blend contains a polyaramide which has at least the recurring structural units of the formulae

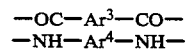

and

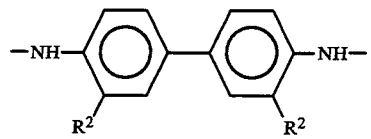

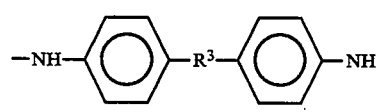

where
— Ar⁵— and —Ar⁴— are each phenylene or naphthylene radicals where the valence bonds are in the para or coaxial or parallel position and which are optionally substituted by (C₁-C₆)-alkyl, (C₁-C₆)-alkoxy, —CF₃ or halogen,
—R²— is lower alkyl or lower alkoxy, each of up to 4 carbon atoms, or halogen, and
—R³— is a radical of the formula —C(R¹)₂—, where R¹ is hydrogen, (C₁-C₆)-alkyl or fluoroalkyl having 1-4 carbon atoms in the alkyl group, or a group —O—Ar⁴—O—, and the proportions, in mol %, of the diamine components B, C and D relative to the total amount of diamine components are within a domain which is defined by the following corner points in a triangular coordinate system:

Point Q corresponding to 5 mol % of B, 45 mol % of C and 50 mol % of D;
Point R corresponding to 45 mol % of B, 5 mol % of C and 50 mol % of D;
Point S corresponding to 60 mol % of B, 35 mol % of C and 5 mol % of D;
Point T corresponding to 20 mol % of B, 75 mol % of C and 5 mol % of D;
Point U corresponding to 5 mol % of B, 80 mol % of C and 15 mol % of D.

7. The fiber material as claimed in claim 6, wherein the blend alloy contains a polyaramide where —Ar³— and —Ar⁴— are each 1,4-phenylene, R² is —CH₃, —OCH₃ or —Cl and R³ is

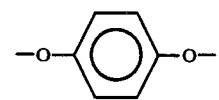

or

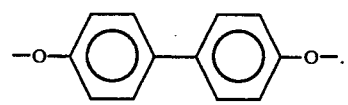

8. The fiber material as claimed in claim 6, wherein —R³— is —CH₂—, —C(CH₃)₂— or —C(CF₃)₂—.

9. A fiber material formed from a synthetic polymer, wherein the synthetic polymer is a homogeneous blend consisting essentially of α) poly-N-vinylpyrrolidone and
β) at least one polyaramide having at least one recurring structural unit of the formula (I)

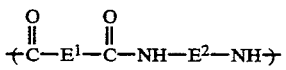
(I)

where $E^1$ and $E^2$ are identical or different and are each selected from the group consisting of

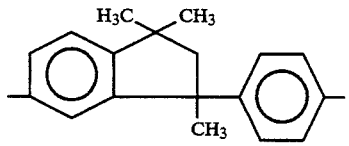
I

—$Ar^1$— and
—$Ar^1$—X—$Ar^2$—, where $Ar^1$ and $Ar^2$ are identical or different, $Ar^1$ being phenylene or naphthylene, $Ar^2$ being phenylene, and $Ar^1$ and $Ar^2$ being optionally substituted by ($C_1$-$C_6$)-alkyl, ($C_1$-$C_6$)-alkoxy, Z—$CF_3$ or halogen, the valence bonds of $Ar^1$ and $Ar^2$ being selected so that at least 95% of recurring structural units of the formulae —OC—$E^1$—CO— and —HN—$E^2$—NH— are in the para or coaxial or parallel position and up to 5% of said recurring structural units are:

J) —OC—$E^1$—CO— units derived from an aromatic dicarboxylic acid containing at least one m-bond, so that said unit is not para-disposed or parallel or coaxial, or K) —HN—$E^2$—NH— units derived from an aromatic diamine containing at least one m-bond, so that said unit is not para-disposed or parallel or coaxial, or combinations of J and K; and X is a) a direct bond or one of the following divalent radicals: —O—, —$SO_2$—, —CO—, —CO—NH—, —$C(R^1)_2$—, where $R^1$ is hydrogen, ($C_1$-$C_6$)-alkyl or fluoroalkyl of 1–4 carbon atoms in the alkyl group, or b) —Z—$Ar^1$—Z—, where Z is —O— or —$C(CH_3)_2$—, or c) —O—$Ar^1$—Y—$Ar^2$—O—, where Y is a direct bond or one of the following divalent radicals: —O—, $SO_2$—, —CO—, —CO—NH—, —$C(R^1)_2$—, wherein said homogeneous blend fiber material has been obtained by spinning filaments, into a coagulation bath, from a polar aprotic solvent solution containing said synthetic polymer, to form a multifilament bundle, said coagulation bath comprising an aqueous solution containing a polar aprotic solvent.

10. The fiber material as claimed in claim 9, wherein —OC—$E^1$—CO— in said formula I is —OC—$Ar^5$—CO— and —NH—$E^2$—NH— in said formula I is —HN—$Ar^6$—NH—, and —$Ar^5$— and —$Ar^6$— are phenylene or naphthylene radicals whose valence bonds are in a para or coaxial or parallel position and which can be substituted by lower alkyl or halogen.

11. The fiber material as claimed in claim 9, wherein the blend contains a polyaramide which consists essentially of: not less than 95 mol % of recurring structural units of the formulae

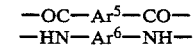
L)
M)

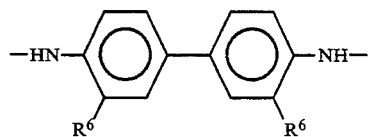
N)

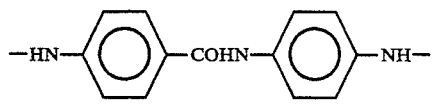
O)

and not more than 5 mol % of said structural units J, K or combinations thereof, the totals of the molar proportions of structural units L with structural unit J and of the molar proportions of structural units M with structural units N, O and K essentially the same, —$Ar^5$— and —$Ar^6$— are each phenylene or naphthylene radicals whose valence bonds are in a para or coaxial or parallel position and which can be substituted by one or two inert radicals, —$R^6$ is lower alkyl and the proportions of diamine components M, N and O relative to the total amount of these diamine components are within the following limits:
structural unit M: 15–25 mol %
structural unit N: 45–65 mol %
structural unit O: 15–35 mol %.

12. The fiber material as claimed in claim 11, wherein the blend contains a polyaramide where —$R^6$ is alkyl of 1 or 2 carbon atoms.

13. The fiber material as claimed in claim 9, wherein the blend contains a polyaramide which consists essentially of: not less than 95 mol % of recurring structural units of the formulae

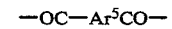
E)
F)

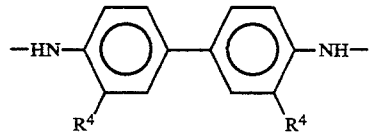
G)

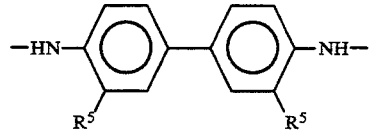
H)

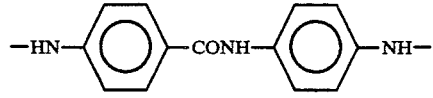

and not more than 5 mol % of said structural units J, K or combinations thereof, the totals of the molar proportions of structural units E with structural unit J and of the molar proportions of the structural units F with structural units G, H and K being essentially the same, —$Ar^5$— is a phenylene or naphthylene radical whose valence bonds are in a para- or coaxial or parallel position and which can be substituted by one or two inert radicals, —R⁴ and —R⁵ are mutually different lower alkyl or lower alkoxy, and the proportions of diamine components F, G and H relative to the total amount of these diamine components are within the following limits:

structural unit F: 30–55 mol %
structural unit G: 15–35 mol %
structural unit H: 20–40 mol %.

14. The fiber material as claimed in claim 9, wherein the alloy contains a polyaramide which consists essentially of: not less than 95 mol % of recurring structural units of the formulae

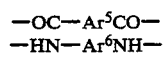     L)

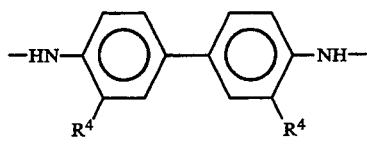     M)

P)

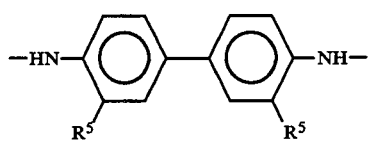     R)

and not more than 5 mol % of said structural units J, K or combinations thereof, the totals of the molar proportions of structural units L with structural unit J and of the molar proportions of structural units M with structural units P, R and K being essentially the same, —Ar⁵— and —Ar⁶— are phenylene or naphthylene radicals whose valence bonds are in a para or coaxial or parallel position and which can be substituted by one or two inert radicals, —R⁴ and —R⁵ are mutually different lower alkyl or lower alkoxy, and the proportions of diamine components M, P and R relative to the total amount of these diamine components being within the following limits:

structural unit M: 20–30 mol %
structural unit P: 35–55 mol %
structural unit R: 15–40 mol %.

15. The fiber material as claimed in claim 11 or 14, wherein the blend contains a polyaramide where
—Ar⁵— is 1,4-phenylene, 1,4-, 1,5- or 2,6-naphthylene or 4,4′-biphenylylene and
—Ar⁶— is 1,4-phenylene, 1,4-, 1,5- or 2,6-naphthylene.

16. The fiber material as claimed in claim 11 or 13 or 14, wherein the blend contains a polyaramide where
—Ar⁵— and —Ar⁶— are each 1,4-phenylene which is unsubstituted or substituted by lower alkyl or halogen.

17. The fiber material as claimed in claim 11 or 13 or 14, wherein the blend contains a polyaramide where the structural unit which contains m-bonds is the divalent radical of 3,4′- or 3′,4-diaminobenzanilide 18. The fiber material as claimed in claim 13 or 14, wherein the blend contains a polyaramide where
—R⁴ is lower alkyl and
—R⁵ is lower alkoxy.

19. The fiber material as claimed in claim 13 or 14, wherein the blend contains a polyaramide where
—R⁴ is methyl and —R⁵ is methoxy.

* * * * *